United States Patent
Kerschbaum (10) Patent No.: US 7,860,244 B2
(45) Date of Patent: Dec. 28, 2010

(54) SECURE COMPUTATION OF PRIVATE VALUES

(75) Inventor: Florian Kerschbaum, Karlsruhe (DE)

(73) Assignee: SAP AG, Walldorf (DE)

( * ) Notice: Subject to any disclaimer, the term of this patent is extended or adjusted under 35 U.S.C. 154(b) by 1044 days.

(21) Appl. No.: 11/641,265

(22) Filed: Dec. 18, 2006

(65) Prior Publication Data
US 2008/0144832 A1    Jun. 19, 2008

(51) Int. Cl.
*H04K 1/00* (2006.01)
*H04L 9/00* (2006.01)
(52) U.S. Cl. ..................................... 380/30; 380/277
(58) Field of Classification Search .................. 380/30, 380/277
See application file for complete search history.

(56) References Cited

U.S. PATENT DOCUMENTS

| | | | | |
|---|---|---|---|---|
| 5,564,106 A * | 10/1996 | Puhl et al. | ................... | 380/286 |
| 5,764,768 A * | 6/1998 | Spelman et al. | ............ | 725/117 |
| 5,917,911 A * | 6/1999 | Dabbish et al. | ............ | 380/286 |
| 5,991,414 A * | 11/1999 | Garay et al. | ................ | 713/165 |
| 6,240,188 B1 * | 5/2001 | Dondeti et al. | .............. | 380/284 |
| 6,772,339 B1 * | 8/2004 | Jakobsson et al. | ........... | 713/168 |
| 7,058,808 B1 * | 6/2006 | Zolotorev et al. | ........... | 713/176 |
| 7,088,821 B2 * | 8/2006 | Shaik | .......................... | 380/30 |
| 2002/0026345 A1 * | 2/2002 | Juels | ........................... | 705/10 |
| 2003/0012386 A1 * | 1/2003 | Kim et al. | .................... | 380/286 |
| 2004/0174997 A1 * | 9/2004 | Yamamichi et al. | ........... | 380/44 |
| 2005/0021479 A1 * | 1/2005 | Jorba et al. | ................... | 705/67 |
| 2005/0066174 A1 * | 3/2005 | Perlman | ..................... | 713/176 |
| 2005/0086470 A1 * | 4/2005 | Strobl et al. | ................ | 713/163 |
| 2005/0278536 A1 * | 12/2005 | Canard et al. | ............... | 713/180 |
| 2007/0156586 A1 | 7/2007 | Kerschbaum | | |
| 2007/0220094 A1 | 9/2007 | Kerschbaum et al. | | |
| 2008/0141035 A1 * | 6/2008 | Furukawa | .................. | 713/180 |

\* cited by examiner

*Primary Examiner*—Techane J Gergiso
(74) *Attorney, Agent, or Firm*—Schwegman, Lundberg & Woessner, P.A.

(57) ABSTRACT

An embodiment may include a system having a communication unit and a processing unit. The communication unit may be configured to receive an encrypted private value of a party, the encrypted private value being generated from a private value with a public-key encryption system and a public key, to send an encrypted blinded result to the party, and to receive a blinded result generated from the encrypted blinded result. The processing unit may be configured to compute a result of a function, the function having as input the private value, to blind the result of the function to generate the encrypted blinded result, and to compute the result by unblinding the blinded result.

26 Claims, 8 Drawing Sheets

SECURE COMPUTATION OF PRIVATE VALUES

TECHNICAL FIELD

Embodiments relate to the field of electronic data processing and more particularly to secure computations.

BACKGROUND AND PRIOR ART

Secure computation is a field of electronic data processing where a part of processed data may be private. Private data may be for example data that is provided by a party and that should not be revealed to a further party. In an example of a secure computation application, a party may provide private data and a further party may use the private data to compute a result.

More specifically, the further party may be a platform provider that uses private data from multiple parties to compute for example statistical quantities. In such a case, the private data of the party should be protected against an access of the further party and of each one of the other multiple parties. The multiple parties may be enterprises competing in a market or members of a peer group of organizations. The private data may represent business data that a party may be willing to provide for a return of statistical quantities under the condition that a privacy of the private data is ensured. The statistical quantities may be provided to the multiple parties that compare the statistical quantities to corresponding private data.

In an example, the private data may be represented by private values of a key figure. Each one of the multiple parties may be able to benchmark its private values to statistical values computed from private values of a group of direct competitors or a peer group. The private values may represent performance values such as key performance indicators describing for example rates of faulty products of a production line, average costs of a product, or average procurement costs of certain components.

DETAILED DESCRIPTION

Following embodiments address a secure computation of private values of a party. The private values may be provided by the party to a further party that processes the private values. A processing of the private values may be performed in such a way that a privacy of the private values is ensured with a certain level of security against an unauthorized access of the further party. A processing of the private values may involve a processing of further private values provided by further providing parties. In such a case, a privacy of the private values may be ensured with a certain level of security against an unauthorized access of the further party and the further providing parties. Also, the further private values provided by further providing parties may be ensured with a certain level of security against an unauthorized access of the party. Furthermore, anonymity of the party and the further providing parties may be ensured with a certain level of security.

An example embodiment may include a system for providing a private value. The system may encrypt, decrypt, and exchange data in such a way that a certain level of security for the private value is provided by using public key encryption systems.

Furthermore, anonymity of the system or the party using the system may be protected with regards to further parties providing private values. Furthermore, the system may be efficient by being able to use the public key encryption system for a large number of parties providing private values. The public key encryption system may be used so that the number of keys may be low also with a large number of parties providing private values. The system may be further efficient by being able use types of calculations that are computationally fast to perform. The system may provide the private value in a low number of rounds of an exchange protocol so that idling time of the system waiting for responses is short. The number of rounds may be independent of the number of parties providing private values. The number of rounds may also be independent of the number of private values that are provided by each party and that may also be independent of other private values provided by each party.

An example embodiment may include a further system for processing the private value. The further system may process encrypted values, blind computation results, and exchange values in such a way that a certain level of security for the private value is provided by using public key encryption systems.

The further system may further contribute to protecting the anonymity of parties providing private values and providing a privacy of private values of each party. The further system may be efficient by being able to use the public key encryption system with a large number of parties providing private values, to use types of calculations that may be computed quickly, and to use a low number of exchange rounds that is independent of the number of parties providing private values and of the number of independent private values provided by each party.

An example embodiment may include a method for providing the private value. The method may encrypt, decrypt, and exchange value in such a way that a certain level of security for the private value is provided by using public key encryption systems.

The method may be performed to ensure privacy of the private value with regard to a party processing the private value and further systems providing also private values. The method may further protect the anonymity of the party providing the private value. The method may be efficient by being able to use the public key encryption system with a large number of parties providing private values, to use types of calculations that may be computed quickly, and to use a low number of exchange rounds that is independent of the number of parties providing private values and of the number of independent private values provided by each party.

An example embodiment may include a further method for processing the private value. The further method may process encrypted values, blind computation results, and exchange values in such a way that a certain level of security for the private value is provided by using public key encryption systems.

The further method may further contribute to protecting the anonymity of parties providing private values and providing a privacy of private values of each party. The further method may be efficient by being able to use the public key encryption system with a large number of parties providing private values, to use types of calculations that may be computed quickly, and to use a low number of exchange rounds that is independent of the number of parties providing private values and of the number of independent private values provided by each party.

An example embodiment may include a computer program product for providing the private value.

The computer program product may be used to ensure privacy of the private value and protect the anonymity of the party providing the private value in an efficient way.

An example embodiment may include a further computer program product for processing the private value.

The further computer program product may be used to contribute to ensuring privacy of the private value and to protect the anonymity of the party providing the private value in an efficient way.

The following description of examples includes details for illustrating embodiments and is not intended to limit the scope of the embodiments or to be exhaustive. For purposes of explanation, specific details are set forth in order to provide a thorough understanding of example embodiments. A person skilled in the art may appreciate that further embodiments may be practiced with details that differ from the specific details.

Figure 1:
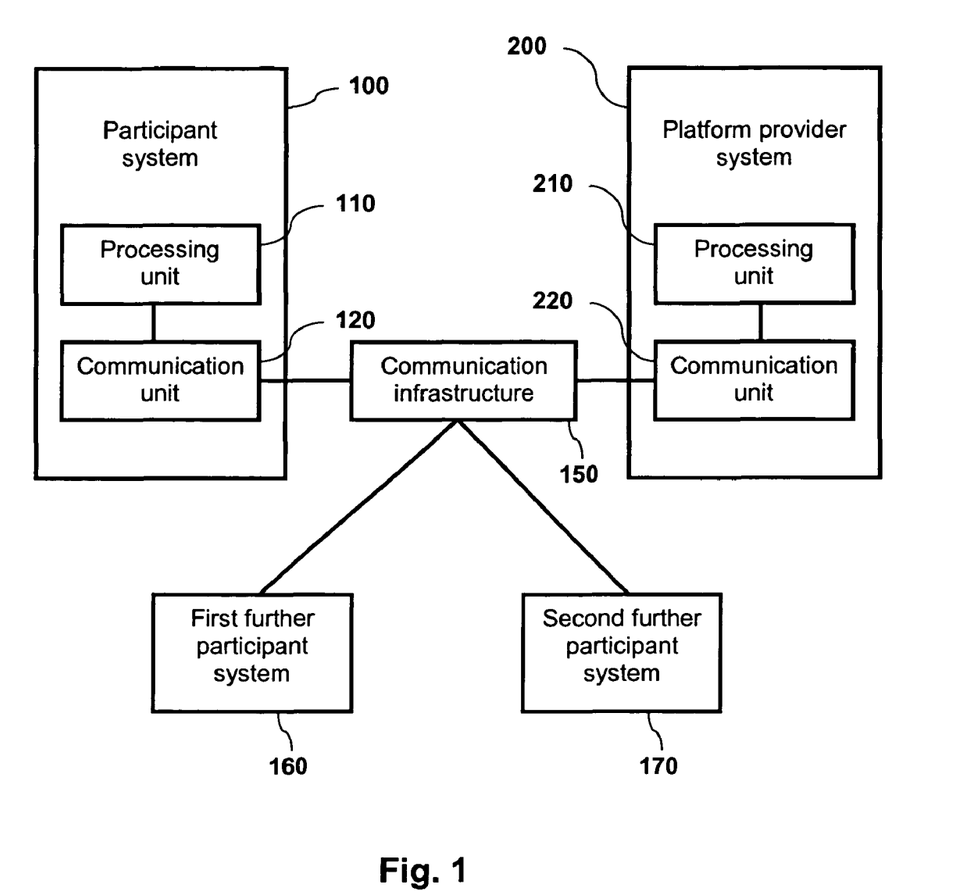
FIG. 1 is a block diagram of a participant system, according to an example embodiment, for providing private values and a platform provider system, according to an example embodiment, for processing private values.

FIG. 1 is a block diagram of a participant system 100, according to an example embodiment, for providing private values and a platform provider system 200, according to an example embodiment, for processing private values. Communicative couplings between elements of the figure are represented by lines between the elements and may be configured to exchange data in both directions between the elements. The participant system 100 includes a processing unit 110 and a communication unit 120 connected to a communication infrastructure 150. The platform provider system 200 includes a processing unit 210 and a communication unit 220 connected to the communication infrastructure 150. A first further participant system 160 and a second further participant system 170 are also connected to the communication infrastructure 150.

The participant system 100 may be a computer system such as a personal computer (PC), a server, a plurality of servers configured to execute software programs, or a mainframe computer system. The participant system 100 may include a client and a server related according to a client server architecture or may include one or more peer computers arranged in a peer-to-peer or distributed architecture. In a further example, the participant system 100 may include a plurality of individual computer systems that are connected by the Internet or by an intranet of an entity such as for example a company or an organization.

The participant system 100 may run, for example by hosting and executing, a program that configures the participant system 100 to have units of the system, for example, the processing unit 110 or the communication unit 120. The units may include software units that represent encapsulated or distributed instructions that may be executed by the participant system 100 and that may provide functionality of the units. The units may also include hardware units, for example computer chips and interfaces to connect to further units.

The platform provider system 200 may be a computer system with a hardware that is identical to or different from the participant system 100. The first further participant system 160 and the second further participant system 170 may also be computer systems with a hardware that is identical to or different from the participant system 100. The first further participant system 160 and the second further participant system 170 may provide private values of entities or parties using the first further participant system 160 and the second further participant system 170. In an example, the first further participant system 160 and the second further participant system 170 may be systems according to an embodiment that is identical to or different from the participant system 100. In a further example, the first further participant system 160 and the second further participant system 170 may provide private values in a way that may not be in accordance with an embodiment.

The processing unit 110 may be configured to encrypt a private value of a party with a public-key encryption system and a public key to generate an encrypted private value. The public-key encryption system may be homomorphic to permit certain manipulations of a value that has been encrypted by manipulating the encrypted representation of the value. A homomorphic encryption system E has following features:

$E(x) \cdot E(y) = E((x+y))$ and $(E(x))^y = E((x \cdot y))$. Therefore a value x that is known in an encrypted representation $E(x)$ may be manipulated by adding a value y or multiplying with a value y without decrypting the encrypted representation. Examples for homomorphic encryption systems E are Naccache-Stern encryption systems or Paillier's encryption systems. In a further example, the public-key encryption system may not be homomorphic or have further characteristics to permit different types of manipulation of a value accessible in an encrypted representation.

The public-key encryption system may be semantically secure to provide further protection. In a semantically secure encryption system, a value may be secure from being guessed when an encrypted representation of the value is accessible. Guessing values may include generating systematically different values, encrypting the generated values, and comparing the encrypted, generated values to the encrypted representation of the value.

The processing unit 110 may be configured to decrypt an encrypted blinded result with the public-key encryption system and a private key to generate a blinded result. The private key corresponds to the public key used for encrypting the private value by being configured to decrypt a value that has been encrypted with the public key.

The communication unit 120 may be configured to send the encrypted private value that has been computed by the processing unit 110 to a further party. In the example, the private value is sent through the communication structure 150, for example, the Internet. In a further example, the communication structure 150 may be an intranet of a group of entities such as companies with a restricted access. In a further example, the communication structure 150 may also include an intranet of a company. The further party may use the platform provider system 200 to process the encrypted private value.

The communication unit 120 may be configured to receive the encrypted blinded result. The encrypted blinded result may be a result of a function that has as input the private value that has been sent previously in an encrypted representation to the platform provider system 200.

The communication unit 120 may be configured to send the blinded result to the further party. The blinded result having been generated by the processing unit 110.

In the example, the participant system 100 is further configured to participate in check sum protocol. The check sum protocol may provide a further protection against a platform provider system that attempts to gain information about the private value. In an example, such a platform provider system may send encrypted private values as encrypted blinded results to different participant systems that are in accordance with the participant system 100. Such a platform provider system may then obtain the decrypted private values from the different participant systems. The different participant systems may decrypt the private values because the private values were received from the platform provider system as encrypted blinded results. The check sum protocol may be used to ensure that the platform provider system 200 sends the same value as the encrypted blinded result to each different participant system.

Accordingly, the communication unit 120 may be configured to receive the encrypted blinded result of the function that has as further input private values of the further parties. The processing unit 110 may be configured to compute a check value using an identifier of the party and the blinded result obtained from the encrypted blinded result. The identifier of the party may be a value generated by for example the platform provider system 200 and may therefore protect the anonymity of the party, even if given to further parties. The processing unit 110 may be configured to encrypt the check value with the public-key encryption system and the public key to generate an encrypted check value. The communication unit 120 may be configured to send the encrypted check value to the further party and receive an encrypted sum of check values. The processing unit 110 may be configured to decrypt the encrypted sum of check values of the party and the further parties to generate a sum of check values. The processing unit 110 may be configured to compare the sum of check values to a result of adding the check value to further check values of further parties. This may be done by knowing the check values of the further parties, which again may be obtained by knowing the identifier of the further parties and the manner in which the further parties computed their check values. Each one of the further check values may then be computed from the blinded result and an identifier of the further parties. In case of an identity, within possible rounding errors, of the sum of check values and the result of adding the check value to further check values of further parties the participant system 100 has verified that the identical encrypted blinded result has been sent to different participating systems of the further parties.

The processing unit 110 may compute the check value and each one of the further check values using a hash function having as input a sum of a random variable, the identifier of a party of the further parties, and the blinded result. In a further example, an identity function instead of the hash function may be used, or a set of random variables depending on the identity of the party. However, such a further example may not provide additional security and may result in longer computations or data transmission times. In the example, the random variable may be a pseudo-random variable determined according to a standard computation for pseudo-random variables. This may include for example using a pseudo-random number generator such as Blum Blum Shub, ISAAC or lagged Fibonacci generators. In a further example, a simple determination of random variables may be used but protection from such a simple determination may be low, particularly when large numbers of random variables are used. The above pseudo-random number generators may be applied to determine most or all of the random variables used in described embodiments.

In the example, the blinded result is identical to a result multiplied by a random variable. Furthermore, the function is a summation function that adds the private value to private values of further parties. Such a multiplication with a random variable and such a summation function are manipulations permitted by using homomorphic encryption schemes.

In the example, the platform provider system 200 has the communication unit 220 that may be configured to receive the encrypted private value from the participant system 100. Furthermore, the communication unit 210 may be configured to send the encrypted blinded result to the party using the participant system 100 and receive a blinded result generated from the encrypted blinded result.

The processing unit 210 may be configured to compute the result of a function that has as input the private value and blind the result of the function to generate the encrypted blinded result. Following a receiving of the blinded result, the processing unit 210 may compute the result by unblinding the blinded result.

The platform provider system 200 may participate in the check sum protocol. Accordingly, the processing unit 210 may be configured to compute the result of the function that has as further input private values of the further parties. The processing unit 210 may add the check value of the party using the participant system 100 to check values of the further parties to generate an encrypted sum of check values of the party and the further parties. The communication unit 220 may be configured to receive the encrypted check value from the participant system 100 and send the encrypted sum of check values to the party using the participant system 100.

The public-key encryption system is homomorphic and semantically secure, in accordance with the public-key encryption system of the participant system 100. As specified in the description of the participant system 100, the processing unit 210 is configured to blind the result by multiplying the result by a random variable and to compute the result of a summation function that adds the private value to private values of further parties.

The participant system 100 and the platform provider system 200 participate in a protocol that may use a public key encryption system. In an example, the participant system 100 has the public key for encrypting and the corresponding private key for decrypting and the platform provider system 200 has the public key for encrypting. Such pairs of corresponding public keys and private keys may be communicated by a certificate authority signing the public keys in a public key infrastructure. Such a certification authority may be used to distribute the public key to the participant system 100 and the platform provider system 200. Furthermore, in case that further parties provide private values using a system that is in accordance with the participant system 100, the private key may be distributed by a certificate authority to each party providing private values. However, the platform provider system 200 may be required to be excluded from receiving the private key. When multiple different private values are exchange in parallel data exchanges, different pairs of public and private keys may be used for the different multiple private values. The different pairs of public and private keys may be provided by the certificate authority in a common string to the parties providing the private values. The public keys may be provided in a further string to the platform provider system 200.

Figure 2A:
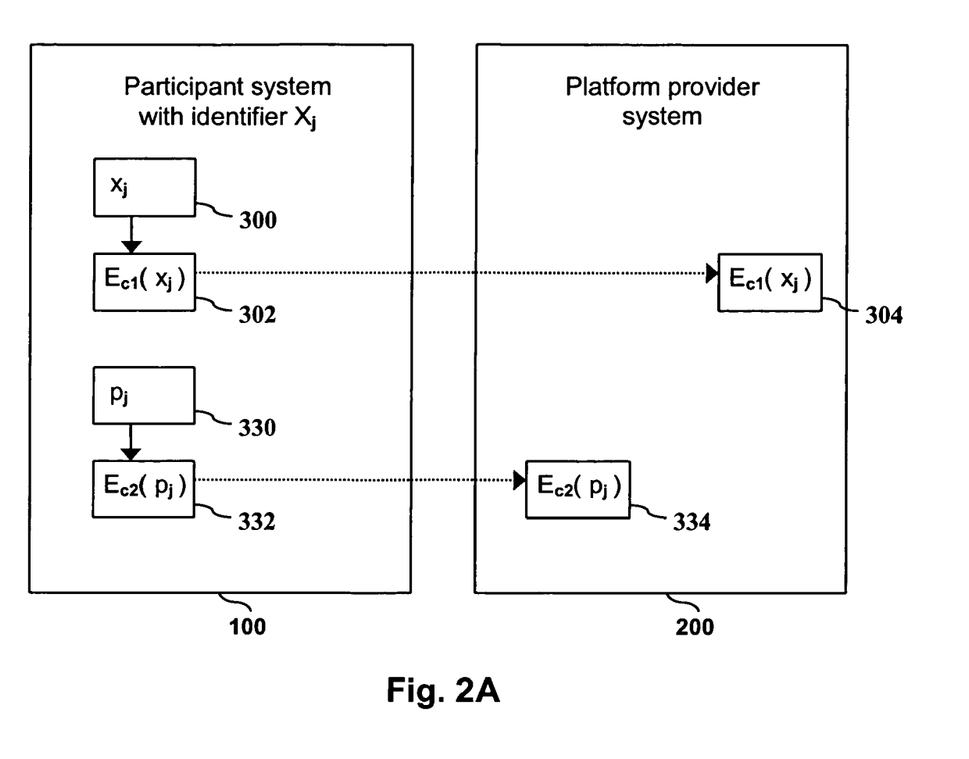
FIG. 2A is a block diagram of a first round of an example protocol for calculating different statistical quantities.

FIG. 2A is a block diagram of a first round of an example protocol for calculating different statistical quantities. In the example, the participant system 100 for providing private values and the platform provider system 200 for processing private values participate in a protocol to compute three statistical quantities: an average value of private values provided by contributing parties, a total number of the contributing parties, and a variance value of the private values provided by the contributing parties.

The example protocol may be executed in four rounds, independently of the number of parties providing private data and the number of further independent private values that are provided. In an example, a round may be defined by including protocol operations, such as data exchanges or data processing that are executable without input from further parties.

The following calculation of the three statistical quantities may be summarized as using the participant system 100 and the platform provider system 200 (see FIG. 1) three times for three different private values: a first private value being a numerical value and the function being a summation function that adds the private value to first private values of further parties; a second private value indicating if the party contributes to a result of the summation function and the function being a counting function that counts contributions from the party and the further parties to generate a total number of contributing parties; and a third private value being a square of a difference between the numerical value and the average value and the function being the summation function. Furthermore, the participant system 100 and the platform provider system 200 may have further features to participate in the example protocol: processing unit 210 of the platform provider system 200 may be further configured to compute an average value generated from the result of the summation function and a result of the counting function, the communication unit 220 may be further configured to send the average value to the participant system 100, and the communication unit 120 of the participant system 100 may be further configured to receive an average value generated from the result of the summation function and a result of the counting function.

The first round includes the participant system 100 with the identifier $X_j$ encrypting a first private value 300 $x_j$ with the public key encryption system to generate the encrypted first private value 302 $E_{c1}(x_j)$. The index c1 of the encryption function identifies a public key that is used for the encryption of the first private value 300. The encrypted first private value 302 is sent to the platform provider system 200 that receives the value as an encrypted first private value 304 $E_{c1}(x_j)$.

The first round of the example protocol further includes the participant system 100 encrypting a second private value 330 $p_j$ with the public key encryption system to generate the encrypted second private value 332 $E_{c2}(p_j)$. In the example, the second private value 330 may be one if the participant system 100 contributes the first private value 300 and zero if the participant system 100 does not contribute the first private value 300 (or only a zero value as the private value 300). In a further example, the second private value 330 may also indicate by values different from one or zero if the participant system 100 contributes or does not contribute the first private value 300. A total number of contributing parties may be calculated from the second private value 330 by adding second private values of the parties providing first private values. The index c2 identifies a public key that is used for the encryption of the second private value 330. In the example, the public key identified by c2 is different from the public key identified by c1. However, in a further example, identical keys may be used for encrypting different private values. The encrypted second private value 332 is sent to the platform provider system 200 that receives the value as an encrypted second private value 334 $E_{c2}(p_j)$.

Figure 2B:
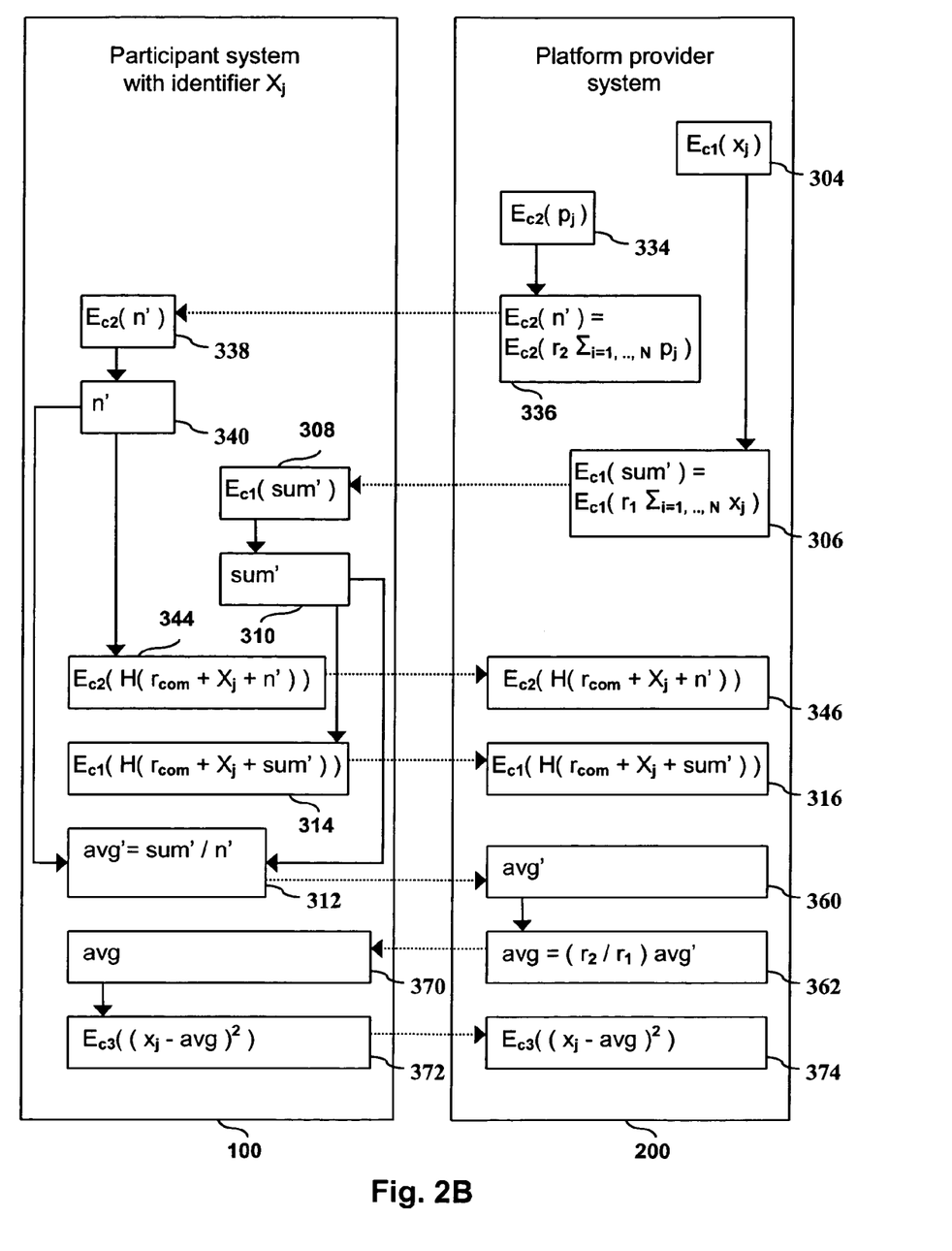
FIG. 2B is a block diagram of a second round of the example protocol for calculating the different statistical quantities.

FIG. 2B is a block diagram of a second round of the example protocol for calculating the different statistical quantities. In the second round the platform provider system 200 may use the first encrypted private value 304 to compute an encrypted blinded first result 306 $E_{c1}(\text{sum}')$ of the summation function. Using the homomorphism property of the encryption system, the encrypted blinded first result 306 is computed by adding the first private value 300 $x_j$ and further first private values $x_i$, with i different from j, and blinding the sum by multiplication with a random variable $r_1$. The encrypted blinded first result 306 is sent to the participant system 100 that receives the value as an encrypted blinded first result 308 and decrypts the encrypted blinded first result 308 to generate the blinded first result 310 sum'.

The blinded first result 310 may be used to compute a blinded average value 312 avg' and to compute a first check value, $H(r_{com}+X_j+\text{sum}')$, for a first check sum protocol. The first check value may be encrypted to generate an encrypted first check value 314 $E_{c1}(H(r_{com}+X_j+\text{sum}'))$. The encrypted first check value 314 may be sent the platform provider system 200 that receives the value as an encrypted first check value 316.

In the second round, the platform provider system 200 may further use the encrypted second private value 334 to compute an encrypted blinded second result 336 $E_{c2}(n')$ of the summation function. Using the homomorphism property of the encryption system the encrypted blinded second result 336 is computed by adding the second private value 330 $p_j$ and further second private values $p_i$, with i different from j, and blinding the sum by multiplication with a random variable $r_2$. The encrypted blinded second result 336 is sent to the participant system 100 that receives the value as an encrypted blinded second result 338 and decrypts the encrypted blinded second result 338 to generate the blinded second result 340 n'. The blinded second result 340 is identical to the blinded total number of contributing parties. In the example, the random variable $r_2$ may be different from the random variable $r_1$ but in a further example the random variable $r_2$ may be identical to the random variable $r_1$.

The blinded second result 340 may be used to compute the blinded average value 312 avg' and to compute a second check value, $H(r_{com}+X_j+n')$, for a second check sum protocol. The second check value may be encrypted to generate an encrypted second check value 344 $E_{c2}(H(r_{com}+X_j+n'))$. The encrypted second check value 344 may be sent to the platform provider system 200 that receives the value as an encrypted second check value 346.

The participant system 100 may send the blinded average value 312 to the platform provider system 200 that receives the value as a blinded average value 360. The platform provider system 200 may compute the result, that is, the average value 362 avg representing the average value of the contributed first private values by unblinding the blinded average value 360. The average value 362 may be sent to the participant system 100 that receives the value as the average value 370 to compute a third private value 372 $E_{c3}((x_j-\text{avg})^2)$ using a third public key identified by c3. The third private value 372 may be used to compute a variance of the contributed first private values. The third private value 372 is sent to the platform provider system 200 that receives the value as a third private value 374.

Figure 2C:
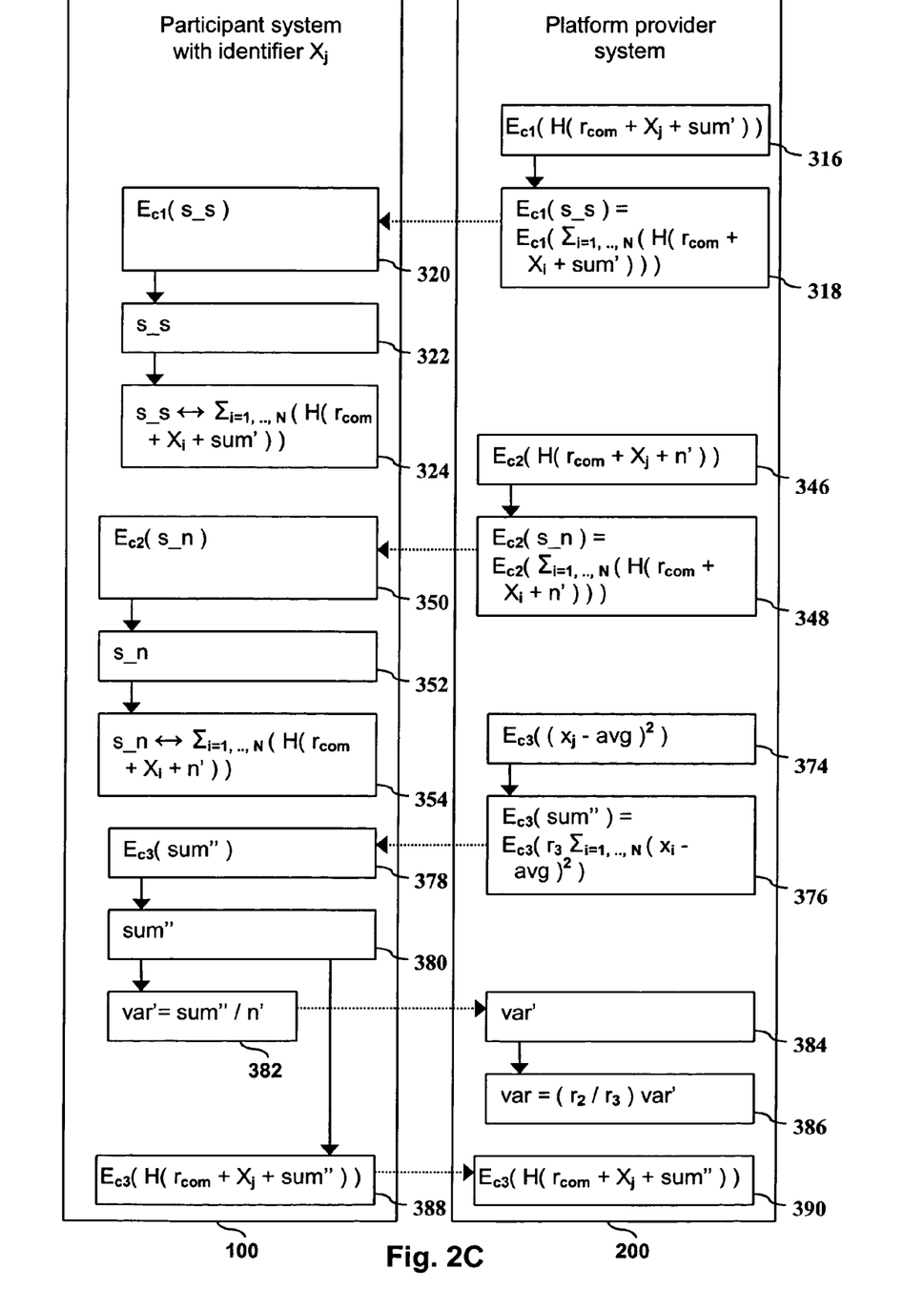
FIG. 2C is a block diagram of a third round of the example protocol for calculating the different statistical quantities.

FIG. 2C is a block diagram of a third round of the example protocol for calculating the different statistical quantities. The encrypted first check value 316 may be used for calculating an encrypted sum of first check values 318 $E_{c1}(s\_s)$ using the homomorphism properties of the public key encryption system. The encrypted sum of first check values 318 is sent to the participant system 100 that receives the value as an encrypted sum of first check values 320.

The participant system 100 may decrypt the encrypted sum of first check values 320 to generate a sum of first check values 322. The sum of first check values 322 may be used for a comparison 324 to a first result of adding the first check value to further first check values of further parties. Each one of the further check values may be computed with the hash function with input including the blinded first result 310, the identifiers of the further parties, and the random variable $r_{com}$. The input is accessible to the participant system 100 and does not reveal further information about the private values or the identities of the further parties.

In the event that the first comparison 324 reveals a difference between the sum of first check values 322 and the first result of the adding the first check values, the participant system 100 may stop a further data exchange. Furthermore, the participant system 100 may publish a warning about the collaboration with the platform provider system 200 and start an investigation to find a source of the difference. In the event that the first comparison 324 reveals an identity between the sum of first check values 322 and the result of the adding the participant system 100 may continue to participate in the data exchanges.

The encrypted second check value 346 may be used for calculating an encrypted sum of second check values 348 $E_{c2}(s\_n)$ using the homomorphism properties of the public key encryption system. The encrypted sum of second check values 348 may be sent to the participant system 100 that receives the value as an encrypted sum of second check values 350.

The participant system 100 may decrypt the encrypted sum of second check values 350 to generate a sum of second check values 352. The sum of second check values 352 may be used for a second comparison 354 to a result of adding the second check value to further second check values of the further parties. Each one of the further second check values may be computed with the hash function with input including the blinded second result 330, the identifiers of the further parties, and the random variable $r_{com}$. In a further example, the random variables used for the second check sum protocol may be different from the random variables used for the first check sum protocol. Furthermore, in a further example, the hash function used for the second check sum protocol may be different from the hash function used for the first check sum protocol.

In the event that the second comparison 354 reveals a difference between the sum of second check values 352 and the second result of the adding second check values, the participant system 100 may stop a further data exchange. The participant system 100 may publish a warning about the collaboration with the platform provider system 200 and start an investigation to find a source of the difference.

The platform provider system 200 may use the encrypted third private value 374 to compute an encrypted blinded third result 376 $E_{c3}(sum'')$ of the summation function. Using the homomorphism property of the encryption system, the encrypted blinded third result 376 is computed by adding the third private value $(x_j-avg)^2$ and further third private values $(x_i-avg)^2$, with i different from j, and blinding the sum by multiplication with a random variable $r_3$. The encrypted blinded third result 376 is sent to the participant system 100 that receives the values as an encrypted blinded third result 378 and decrypts the encrypted blinded third result 378 to generate the blinded third result 380 sum".

The blinded third result 380 may be used to compute a blinded variance value 382 var' and to compute a third check value, $H(r_{com}+X_j+sum'')$, for a third check sum protocol. The third check value may be encrypted to generate an encrypted third check value 388 $E_{c3}(H(r_{com}+X_j+sum''))$. The encrypted third check value 388 may be sent the platform provider system 200 that receives the value as an encrypted third check value 390.

The platform provider system 200 may send the blinded variance value 382 to the platform provider system 200 that receives the value as a blinded variance value 384. The platform provider system 200 may compute the result, that is, the variance value 386 var representing the variance value of the contributed first private values by unblinding the blinded variance value 384.

Figure 2D:
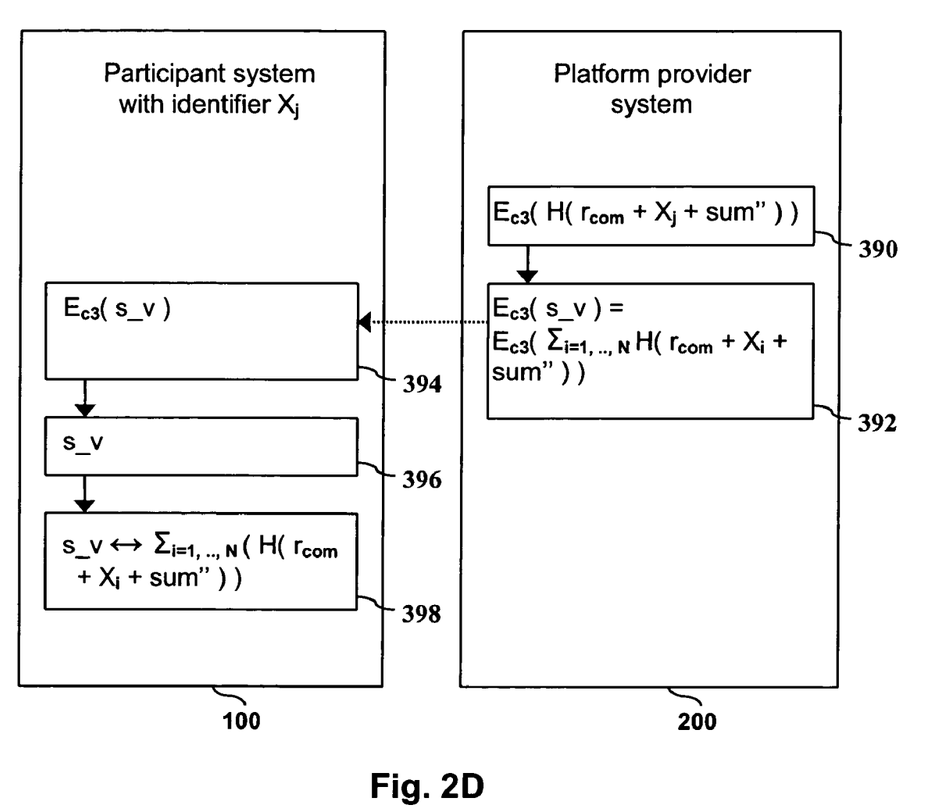
FIG. 2D is a block diagram of a fourth round of the example protocol for calculating the different statistical quantities.

FIG. 2D is a block diagram of a fourth round of the example protocol to calculate the different statistical quantities. The encrypted third check value 390 may be used for computing an encrypted sum of third check values 392 $E_{c3}(s\_v)$ using the homomorphism properties of the public key encryption system. The encrypted sum of third check values 392 may be sent to the participant system 100 that receives the value as an encrypted sum of third check values 394.

The participant system 100 may decrypt the encrypted sum of third check values 394 to generate a sum of third check values 396. The sum of third check values 396 may be used for a third comparison 398 to a result of adding the third check value to further third check values of further parties. Each one of the further third check values may be computed with the hash function from input including the blinded third result 380, the identifiers of the further parties, and the random variable $r_{com}$. In a further example, the random variables used for the third check sum protocol may be different from the random variables used for the first check sum protocol or the second check sum protocol.

In the event that the comparison 398 reveals a difference between the second sum of check values 396 and the third result of the adding the participant system 100 may stop a further data exchange.

Figure 3:
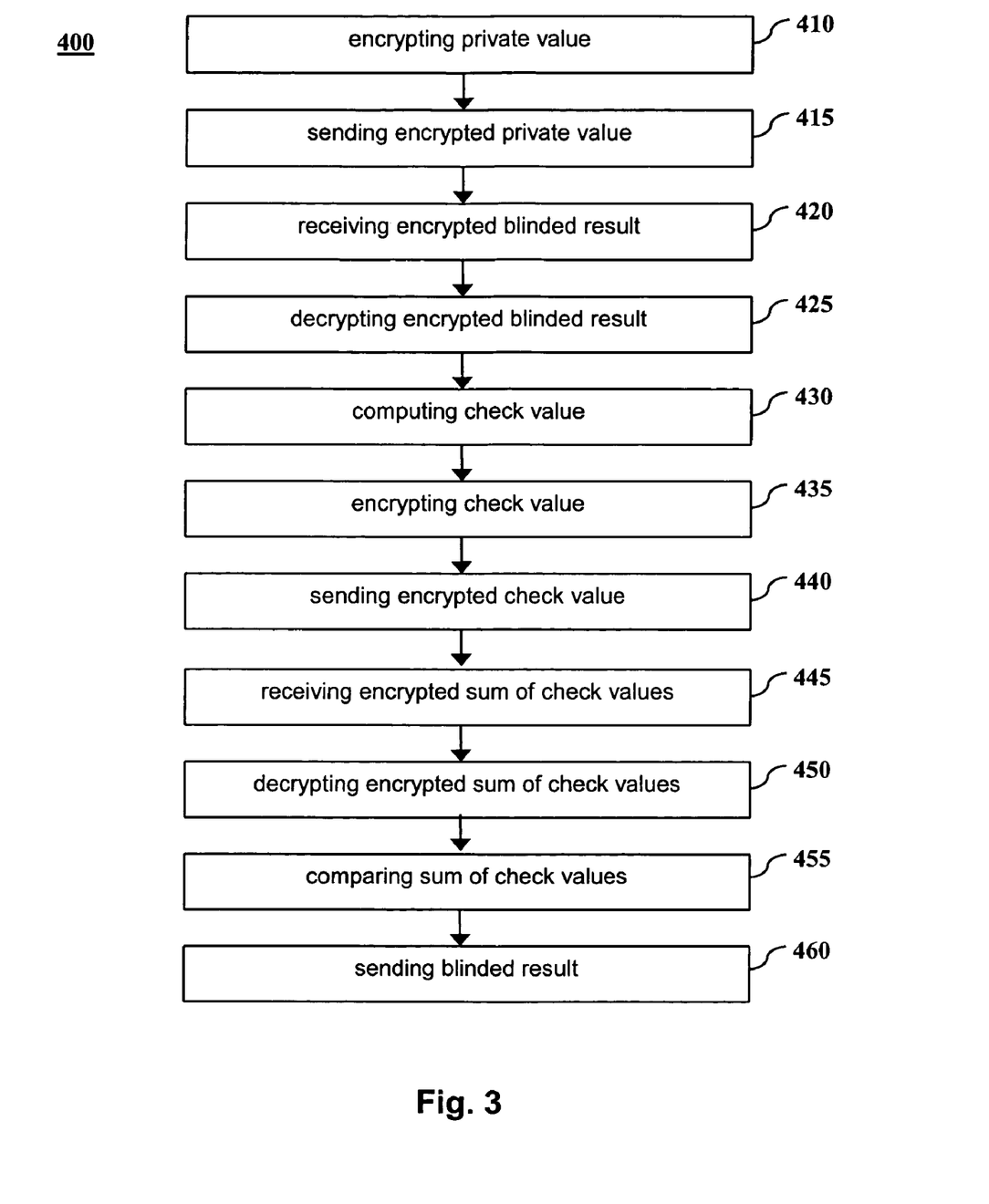
FIG. 3 is a flow diagram of a method, according to an example embodiment, for providing private data.

FIG. 3 is a flow diagram of a method 400, according to an example embodiment, for providing private data. The method 400 may for example be a computer-implemented method. An operation of the method 400 that is independent of a further operation of the method 400 may be executed prior to the further operation or following the further operation. The operation may be independent of the further operation because a result of the operation may not be required for executing the further operation and a result of the further operation may not be required for executing the operation.

The method 400 may include encrypting 410 the private value of a party with a public-key encryption system and a public key to generate an encrypted private value. The party may be for example the participant system 100 and the public-key encryption system may be homomorphic and semantically secure.

The method 400 may include sending 415 the encrypted private value to a further party, for example the platform provider system 200, and receiving 420 the encrypted blinded result of a function. In the example, the function is a summation function and has as input the private value and adds the private value to further private values of further parties. In the example, the blinded result is identical to a result multiplied by a random variable.

Decrypting 425 the encrypted blinded result with the public-key encryption system and a private key to generate a blinded result may follow.

In the example, a check sum protocol may include computing 430 a check value using an identifier of the party and the blinded result, encrypting 435 the check value with the public-key encryption system and the public key to generate an encrypted check value, sending 440 the encrypted check value to the further party, receiving 445 an encrypted sum of check values of the party and the further parties, decrypting 450 the encrypted sum of check values to generate a sum of check values, and comparing 455 the sum of check values to a result of adding the check value to further check values of the further parties.

In an example, computing 430 the check value and each one of the further check values may include using a hash function having as input a sum of a random variable, the identifier of a party of the further parties, and the blinded result.

The method 400 may use a private value that indicates if the party contributes to a further result and a function that is a counting function counting contributions from the party and further parties to generate a total number of contributing parties. The further result may be a result processed in a further execution of operations using a different type of private value. The operations may be in accordance with operations of method 400 or may be different from operations of method 400.

The method 400 may further include sending 460 the blinded result to the further party.

In an example, operations of the method 400 may be used as a building block protocol that is executed multiple times to compute different statistical quantities in an efficient way. An efficient way may include using few rounds of a composite protocol. As an example for such a composite protocol, operations of method 400 may be executed multiple times: a first time with the private value being a numerical value and the function being a summation function; a second time with the private value indicating if the party contributes to a result of the summation function and the function being a counting function that counts contributions from the party and the further parties to generate a total number of contributing parties; a third time with the private value being a square of a difference between the numerical value and the average value and the function being the summation function. Prior to executing operations of the method 400 for the third time, the composite method may include receiving an average value generated from the result of the summation function and a result of the counting function.

Figure 4:
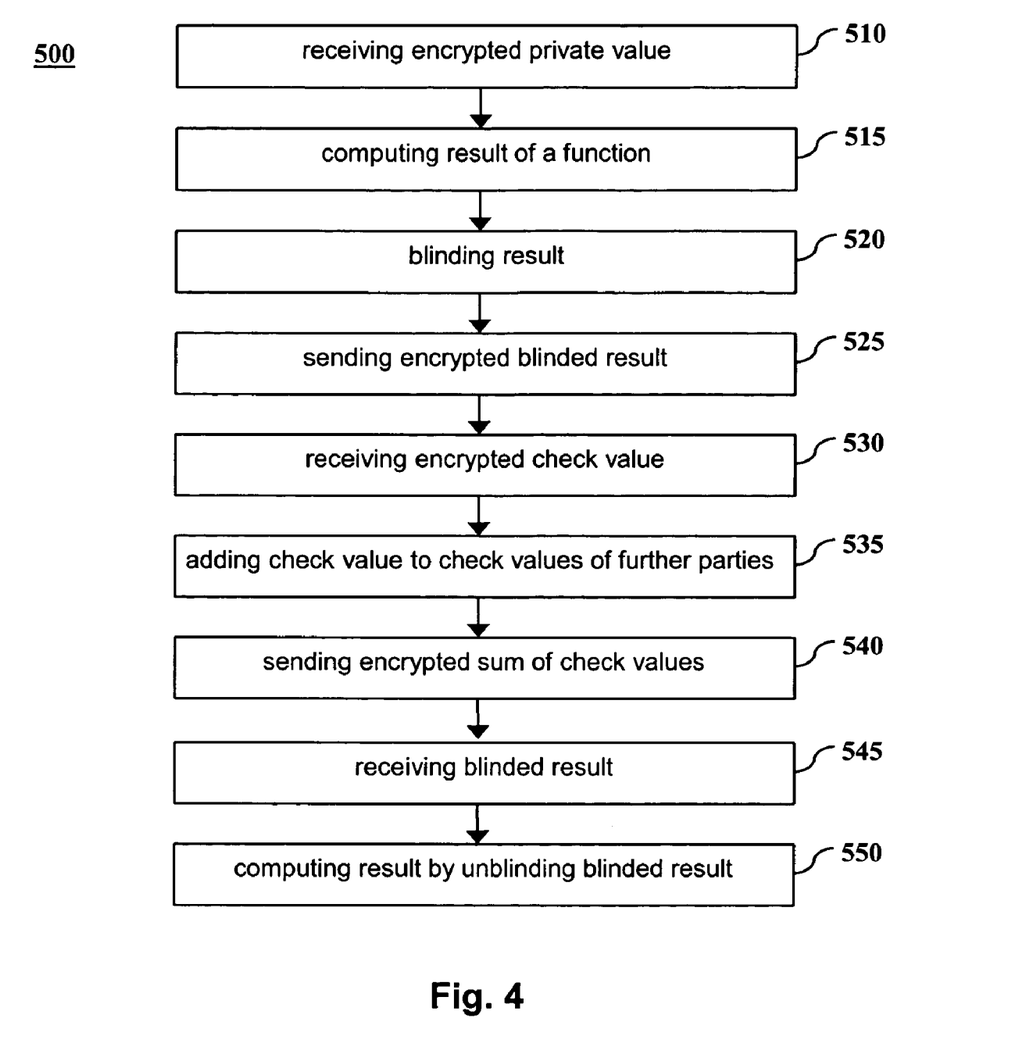
FIG. 4 is a flow diagram of a further method, according to an example embodiment, for processing private data.

FIG. 4 is a flow diagram of a further method 500, according to an embodiment, for processing private data. The method 500 may for example be a computer-implemented method. An operation of the method 500 that is independent of a further operation of the method 500 may be executed prior to the further operation or following to the further operation.

The method 500 may include receiving 510 the encrypted private value of a party providing the private value for the computation of a statistical quantity. The encrypted private value may be generated from a private value with a public-key encryption system that may be homomorphic and semantically secure and a public key.

The method 500 may include computing 515 the result of the function. In the example, the function is a summation function and has as input the private value and adds the private value to further private values of further parties. In the example, the blinded result is identical to a result multiplied by a random variable.

Blinding 520 the result of the function to generate an encrypted blinded result may follow. Blinding 520 the result may include multiplying the result by a random variable.

The method 500 may include sending 525 the encrypted blinded result to the party providing the private value.

In the example, a check sum protocol may be executed that includes: receiving 530 the encrypted check value generated from a check value, adding 535 the check value to check values of the further parties to generate an encrypted sum of check values, and sending 540 the encrypted sum of check values to the party.

The method 500 may include receiving 545 the blinded result generated from the encrypted blinded result and computing 550 the result by unblinding the blinded result.

In an example, operations of the method 500 may be used as a building block protocol that is executed multiple times to compute different statistical quantities in an efficient way. As an example for such a composite protocol, operations of method 500 may be executed multiple times: a first time with the private value being a numerical value and the function being a summation function that adds the private value to private values of further parties; a second time with the private value indicating if the party contributes to a result of the summation function and the function being a counting function that counts contributions from the party and the further parties to generate a total number of contributing parties; and a third time with the private value being a square of a difference between the numerical value and the average value and the function being the summation function. Prior to executing operations of the method 500 for the third time the composite method may include computing an average value generated from the result of the summation function and a result of the counting function and sending the average value to the party providing the private value.

Figure 5:
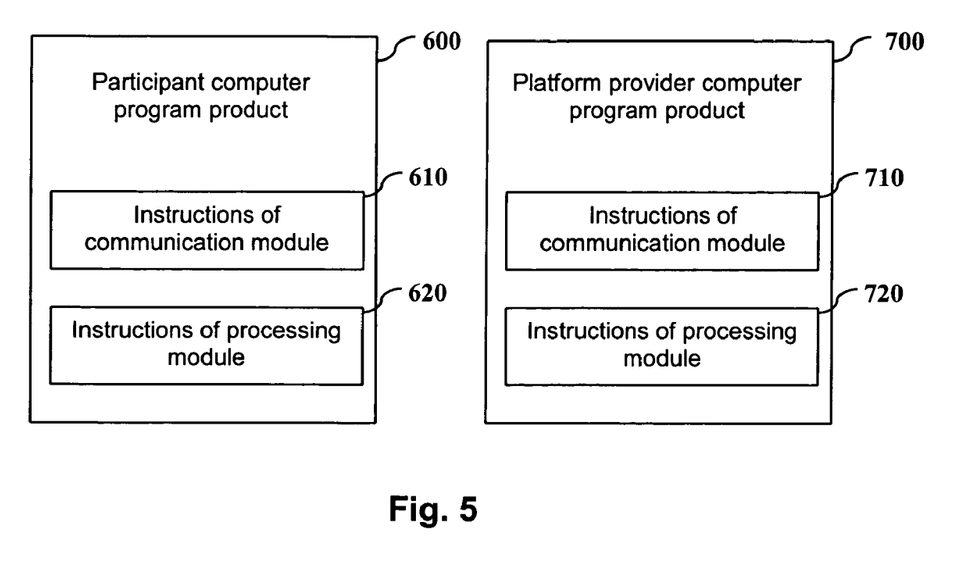
FIG. 5 is a block diagram of an example participant computer program product and an example platform provider computer program product.

FIG. 5 is a block diagram of an example participant computer program product 600 and an example platform provider computer program product 700. The participant computer program product 600 and the platform provider computer program product 700 may have instructions that are executable by a computer system. Prior to being executed by a computer system the instructions may be configured to be loaded into a memory of the computer system.

The participant computer program product 600 may include instructions 610 of a communication module and instructions 620 of a processing module.

The instructions 610 of the communication module may be configured to: send the encrypted private value to a further party, receive the encrypted blinded result of a function, the function having as input the private value, and send the blinded result to the further party.

The instructions 620 of the processing module may be configured to: encrypt a private value of a party with a public-key encryption system and a public key to generate an encrypted private value and decrypt an encrypted blinded result with the public-key encryption system and a private key to generate a blinded result.

The platform provider computer program product 700 may include instructions 710 of a communication module and instructions 720 of a processing module.

The instructions 710 of the communication module may be configured to: receive an encrypted private value of a party, the encrypted private value generated from a private value with a public-key encryption system and a public key, send an encrypted blinded result to the party, and receive a blinded result generated from the encrypted blinded result.

The instructions 720 of the processing module may be configured to: compute a result of a function, the function having as input the private value, blind the result of the function to generate the encrypted blinded result, and compute the result by unblinding the blinded result.

As noted above, example embodiments may include computer program products. The computer program products may be stored on computer-readable media for carrying or having computer-executable instructions or data structures. Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is an example of a computer-readable medium. Combinations of the above are also to be included within the scope of computer-readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. When the computer-executable instructions are transformed, a first computer may for example transform the computer-executable instructions into the executable format and a second computer may execute the transformed instructions. The computer-executable instructions may be organized in a modular way so that a part of the instructions may belong to one module and a further part of the instructions may belong to a further module. However, the differences between different modules may not be obvious and instructions of different modules may be intertwined.

Example embodiments have been described in the general context of method operations, which may be implemented in one embodiment by a computer program product including computer-executable instructions, such as program code, executed by computers in networked environments. Generally, program modules include for example routines, programs, objects, components, or data structures that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such operations.

Some embodiments may be operated in a networked environment using logical connections to one or more remote computers having processors. Logical connections may include for example a local area network (LAN) and a wide area network (WAN). The examples are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, hardware implementations, or equipment for receiving manual inputs.

What is claimed is:

1. A system comprising:
   a hardware-based processing unit to
      encrypt a private value of a party with a public-key encryption system and a public key to generate an encrypted private value and
      decrypt an encrypted blinded result with the public-key encryption system and a private key to generate a blinded result; and
   a communication unit to
      send the encrypted private value to a further party,
      receive the encrypted blinded result of a function, the function having as input the private value, and
      send the blinded result to the further party, a first private value is a numerical value and the function is a summation function that adds the private value to private values of further parties, a second private value indicating whether the party contributes to a result of the summation function and the function is a counting function that counts contributions from the party and the further parties to generate a total number of contributing parties, the communication unit is further to receive an average value generated from the result of the summation function and a result of the counting function, and a third private value is a square of a difference between the numerical value and the average value and the function is the summation function.

2. The system of claim 1, comprising:
   the processing unit to
      compute a check value using an identifier of the party and the blinded result, encrypt the check value with the public-key encryption system and the public key to generate an encrypted check value, decrypt an encrypted sum of check values of the party and the further parties to generate a sum of check values, and compare the sum of check values to a result of adding the check value to further check values of further parties, each one of the further check values computed from the blinded result and an identifier of the further parties; and the communication unit to receive the encrypted blinded result of the function, the function having as further input private values of the further parties, send the encrypted check value to the further party, and receive the encrypted sum of check values.

3. The system of claim 2, the processing unit further to compute the check value and each one of the further check values using a hash function having as input a sum of a random variable, the identifier of a party of the further parties, and the blinded result.

4. The system of claim 1, wherein the public-key encryption system is homomorphic and semantically secure.

5. The system of claim 1, wherein the blinded result is identical to a result multiplied by a random variable.

6. The system of claim 1, wherein the private value indicates if the party contributes to a result and the function is a counting function that counts contributions from the party and further parties to generate a total number of contributing parties.

7. A system comprising:
a communication unit to
receive an encrypted private value of a party, the encrypted private value being generated from a private value with a public-key encryption system and a public key, send an encrypted blinded result to the party, and receive a blinded result generated from the encrypted blinded result; and
a hardware-based processing unit to
compute a result of a function, the function having as input the private value,
blind the result of the function to generate the encrypted blinded result, and
compute the result by unblinding the blinded result, a first private value is a numerical value and the function is a summation function that adds the private value to private values of further parties, a second private value indicating whether the party contributes to a result of the summation function and the function is a counting function that counts contributions from the party and the further parties to generate a total number of contributing parties, the processing unit is further to compute an average value generated from the result of the summation function and a result of the counting function and the communication unit is further to send the average value to the party, and a third private value is a square of a difference between the numerical value and the average value and the function is the summation function.

8. The system of claim 7, comprising:
the processing unit to
compute the result of the function, the function having as further input private values of further parties and
add a check value to check values of the further parties to generate an encrypted sum of check values of the party and the further parties; and the communication unit to
receive an encrypted check value generated from the check value with a public-key encryption system and a public key and
send the encrypted sum of check values to the party.

9. The system of claim 7, wherein the public-key encryption system is homomorphic and semantically secure.

10. The system of claim 7, wherein the processing unit is to blind the result of the function by multiplying the result by a random variable.

11. The system of claim 7, wherein the private value indicates if the party contributes to a further result and the function is a counting function that counts contributions from the party and further parties to generate a total number of contributing parties.

12. A method comprising:
encrypting, using a hardware-based processing unit of a first device, a private value of a party with a public-key encryption system and a public key to generate an encrypted private value;
sending the encrypted private value to a further party at a second device;
receiving an encrypted blinded result of a function, the function having as input the private value;
decrypting, the hardware-based processing unit, the encrypted blinded result with the public-key encryption system and a private key to generate a blinded result; and
sending the blinded result to the further party, wherein in a first executing operation the private value is a numerical value and the function is a summation function that adds the private value to private values of further parties; in a second executing operation the private value indicates whether the party contributes to a result of the summation function and the function is a counting function that counts contributions from the party and the further parties to generate a total number of contributing parties; receiving an average value generated from the result of the summation function and a result of the counting function; and in a third executing operation the private value is a square of a difference between the numerical value and the average value and the function is the summation function.

13. The method of claim 12, comprising:
receiving the encrypted blinded result of the function, the function having as further input private values of further parties;
computing a check value using an identifier of the party and the blinded result;
encrypting the check value with the public-key encryption system and the public key to generate
an encrypted check value;
sending the encrypted check value to the further party;
receiving an encrypted sum of check values of the party and the further parties;
decrypting the encrypted sum of check values to generate a sum of check values; and
comparing the sum of check values to a result of adding the check value to further check values
of the further parties, each one of the further check values computed from the blinded result and an identifier of the further parties.

14. The method of claim 13, computing the check value and each one of the further check values using a hash function having as input a sum of a random variable, the identifier of a party of the further parties, and the blinded result.

15. The method of claim 12, wherein the public-key encryption system is homomorphic and semantically secure.

16. The method of claim 12, wherein the blinded result is identical to a result multiplied by a random variable.

17. The method of claim 12, wherein the private value indicates if the party contributes to a result and the function is a counting function that counts contributions from the party and further parties to generate a total number of contributing parties.

18. A method comprising:
receiving an encrypted private value of a party at a device, the encrypted private value generated from a private value with a public-key encryption system and a public key;
computing a result of a function, the function having as input the private value;
blinding the result of the function to generate an encrypted blinded result;
sending the encrypted blinded result to the party;
receiving a blinded result generated from the encrypted blinded result; and
computing, a hardware-based processing unit, the result of the function by unblinding the blinded result, wherein in a first executing operation the private value is a numerical value and the function is a summation function that adds the private value to private values of further parties; in a second executing operation the private value indicates whether the party contributes to a result of the summation function and the function is a counting function that counts contributions from the party and the further parties to generate a total number of contributing parties; computing an average value generated from the result of the summation function and a result of the counting function; sending the average value to the party; and in a third executing operation the private value is a square of a difference between the numerical value and the average value and the function is the summation function.

19. The method of claim 18, comprising:
computing the result of the function, the function having as further input private values of further parties;
receiving an encrypted check value generated from a check value with a public-key encryption system and a public key;
adding the check value to check values of the further parties to generate an encrypted sum of check values of the party and the further parties; and
sending the encrypted sum of check values to the party.

20. The method of claim 18, wherein the public-key encryption system is homomorphic and semantically secure.

21. The method of claim 18, wherein blinding the result comprises multiplying the result by a random variable.

22. The method of claim 18, wherein the private value indicates if the party contributes to a result and the function is a counting function that counts contributions from the party and further parties to generate a total number of contributing parties.

23. A participant system comprising:
means for encrypting a private value of a party with a public-key encryption system and a public key to generate an encrypted private value and for decrypting an encrypted blinded result with the public-key encryption system and a private key to generate a blinded result; and
means for sending the encrypted private value to a further party, for receiving the encrypted blinded result of a function, the function having as input the private value, and for sending the blinded result to the further party, a first private value is a numerical value and the function is a summation function that adds the private value to private values of further parties, a second private value indicating whether the party contributes to a result of the summation function and the function is a counting function that counts contributions from the party and the further parties to generate a total number of contributing parties, the communication unit is further to receive an average value generated from the result of the summation function and a result of the counting function, and a third private value is a square of a difference between the numerical value and the average value and the function is the summation function.

24. A platform provider system comprising:
means for receiving an encrypted private value of a party, the encrypted private value generated from a private value with a public-key encryption system and a public key, for sending an encrypted blinded result to the party, and for receiving a blinded result generated from the encrypted blinded result; and
means for computing a result of a function, the function having as input the private value,
for blinding the result of the function to generate the encrypted blinded result, and for computing the result by unblinding the blinded result, a first private value is a numerical value and the function is a summation function that adds the private value to private values of further parties, a second private value indicating whether the party contributes to a result of the summation function and the function is a counting function that counts contributions from the party and the further parties to generate a total number of contributing parties, the communication unit is further to receive an average value generated from the result of the summation function and a result of the counting function, and a third private value is a square of a difference between the numerical value and the average value and the function is the summation function.

25. A non-transitory computer readable medium storing instructions, which when executed by hardware-based processing unit, performs a method comprising:
encrypting, using the hardware-based processing unit of a first device a private value of a party with a public-key encryption system and a public key to generate an encrypted private value;
sending the encrypted private value to a further party at a second device;
receiving an encrypted blinded result of a function, the function having as input the private value;
decrypting, using the hardware-based processing unit, the encrypted blinded result with the public-key encryption system and a private key to generate a blinded result; and
sending the blinded result to the further party, wherein in a first executing operation the private value is a numerical value and the function is a summation function that adds the private value to private values of further parties; in a second executing operation the private value indicates whether the party contributes to a result of the summation function and the function is a counting function that counts contributions from the party and the further parties to generate a total number of contributing parties; receiving an average value generated from the result of the summation function and a result of the counting function; and in a third executing operation the private value is a square of a difference between the numerical value and the average value and the function is the summation function.

26. A non-transitory computer readable medium storing instructions, which when executed by a hardware-based processing unit, performs a method comprising:

receiving an encrypted private value of a party at a device, the encrypted private value generated from a private value with a public-key encryption system and a public key;

computing a result of a function, the function having as input the private value;

blinding the result of the function to generate an encrypted blinded result;

sending the encrypted blinded result to the party;

receiving a blinded result generated from the encrypted blinded result; and     computing, using the hardware-based processing unit, the result of the function by unblinding the blinded result, wherein in a first executing operation the private value is a numerical value and the function is a summation function that adds the private value to private values of further parties; in a second executing operation the private value indicates whether the party contributes to a result of the summation function and the function is a counting function that counts contributions from the party and the further parties to generate a total number of contributing parties; computing an average value generated from the result of the summation function and a result of the counting function; sending the average value to the party; and in a third executing operation the private value is a square of a difference between the numerical value and the average value and the function is the summation function.

\* \* \* \* \*